T. LAFITTE.
MOTOR WITH CHANGE SPEED DEVICE.
APPLICATION FILED SEPT. 16, 1920.
1,408,748.
Patented Mar. 7, 1922.
2 SHEETS—SHEET 1.
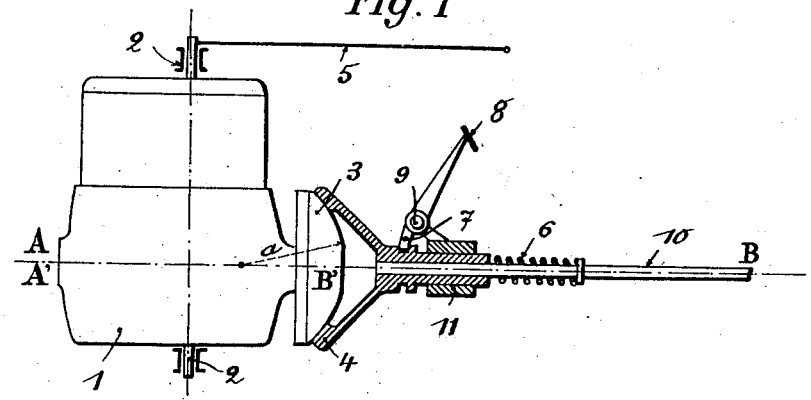
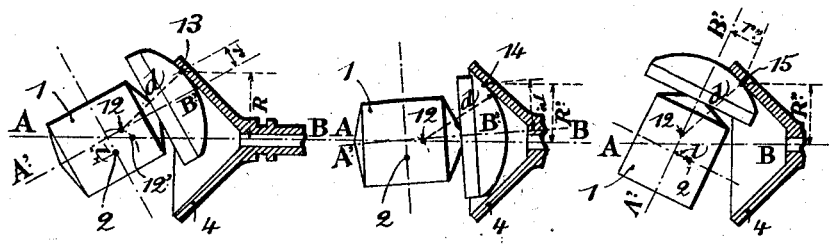
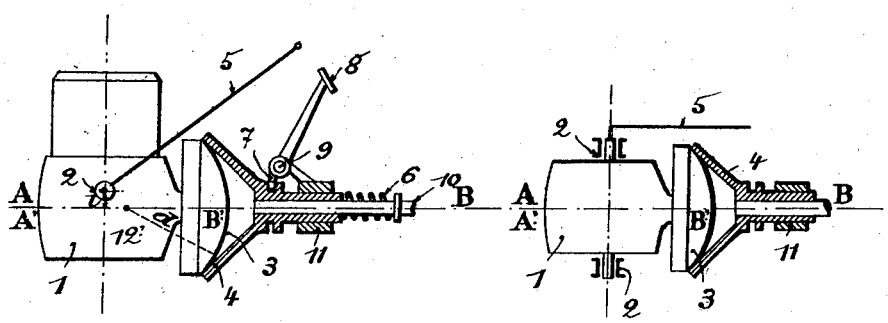
Inventor
Théodore Lafitte
by H. B. Willson &co
Attorneys

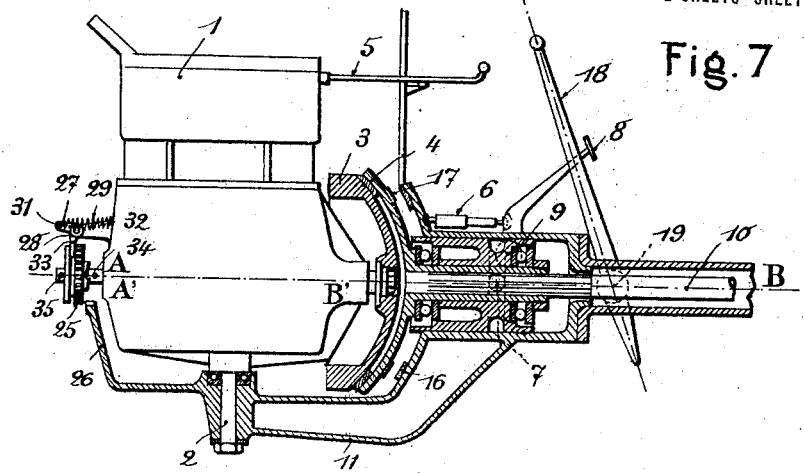

UNITED STATES PATENT OFFICE.

THÉODORE LAFITTE, OF PARIS, FRANCE.

MOTOR WITH CHANGE-SPEED DEVICE.

1,408,748.  Specification of Letters Patent.  Patented Mar. 7, 1922.

Application filed September 16, 1920. Serial No. 410,784.

*To all whom it may concern:*

Be it known that I, THÉODORE LAFITTE, a citizen of the Republic of France, residing at Paris, Seine Department, 15 Avenue Pasteur, in the Republic of France, engineer, have invented certain new and useful Improvements in Motors with Change-Speed Devices, of which the following is a specification.

This invention relates to a motor provided with change speed and reversing gear, and is chiefly applicable to motor vehicles, but can be employed for other mechanical purposes. The accompanying drawings which are given by way of example set forth the general arrangement and operation of this apparatus.

Figs. 1, 2, 3 and 4 are diagrammatic views of one form of construction.

Fig. 1 is an elevation.

Figs. 2, 3 and 4 are plan views corresponding to three different positions of the motor.

Figs. 5 and 6 are diagrammatic views showing an elevation and plan of a second form of construction.

Figs. 7, 8, 9 and 10 show a third form of construction in greater detail.

Fig. 7 is a vertical section of the same, the motor being represented in elevation and in the direct connected position.

Fig. 8 is a plan view showing the motor in the position of reverse motion.

Fig. 9 and 10 are elevation and plan views of the portions of the apparatus employed for clutch coupling and uncoupling.

In Figs. 1 to 4, the motor 1 swings upon two journals 2 disposed according to a vertical line situated at a distance from the horizontal axis A′ B′ of the motor shaft or crankshaft. The motor 1 has secured to its crankshaft a flywheel 3 possessing a friction surface in the form of a spherical cap having a radius $d$. The center of the said cap is situated upon the axis A′ B′ at a point 12. The swinging action of the motor 1 about the axis 2—2 takes place in such manner that its axis A′ B′ may for a given position be brought into coincidence with the axis A B of the actuated shaft 10. To this latter is slidably keyed a conical friction member 4 having the hub thereof journaled in a fixed bearing 11 having mounted thereon a pedal 8, this latter being pivoted to a shaft 9 and carrying an uncoupling projection 7 whereby the said conical member is moved rearwardly against the action of a spring 6 which tends to drive the same against the flywheel 3.

The device operates in the following manner. With the motor disposed as indicated in Fig. 1, that is, with its axis A′ B′ situated in the prolongation of the axis A B, the assemblage composed of the flywheel 3 and conical member 4 acts as an ordinary clutch and the movement of the motor flywheel is transmitted to the shaft 10 in the same sense and at the same speed, thus obtaining the direct drive.

In Fig. 2, the motor has now swung upon its journals 2, and the spherical cap 3 makes contact at 13 with the conical member 4 which is continually impelled by the spring 6; $r$ and $R$ represent the distances from 13 to the axes A′ B′ and A B respectively. In this position the speed reduction ratio is $\frac{r}{R}$ and the shaft 10 rotates in the same direction as the driving shaft.

In Fig. 3, the swinging action is of a different character. The contact takes place at 14; the speed reduction ratio is $\frac{r'}{R'}$; the shaft 10 still rotates in the same direction as the motor shaft.

In Fig. 4, the swinging action has now caused the point of friction to take the position 15 on the opposite side of the axis A′ B′ of the motor shaft, and the speed reduction ratio is now $\frac{r''}{R''}$; the rotation of the conical member 4 now takes place in the inverse sense from A′ B′. In this manner the reverse motion is obtained.

The eccentricity L of the journals 2 with reference to the axis A′ B′ is of the greatest importance. It has the effect of producing the contact between the spherical cap 3 and the hollow conical member at a single point, thus permitting the power transmission to take place normally by enveloping arcs. It will be thus observed that an infinite number of speeds can be obtained between a maximum representing the direct drive and a selected minimum, both for the forward and the reverse motion. For the direct drive, it will be possible to leave the motor free upon its journals 2 in order that the clutch may be automatically centered through the effect of the thrust of the conical member 4 upon the cap 3 under the action of the spring 6. A concave spherical member having a radius greater than $d$ may be substituted for the conical member 4, and in this case the operation will remain the same.

Figs. 5 and 6 show a modified device in which the swinging action takes place around a horizontal shaft $2^a$ the operation remaining the same. In Figs. 7 to 10, a supporting member 11 serving as a bearing for the conical member 4, carries the pivot 2 of the motor 1 and is enlarged at 16 in circular shape in order to permit a facing 17 secured to the coupling and change speed cone 4 to exercise a braking action thereupon. The spring enclosed in a telescoping casing 6 exerts the coupling effect by impelling the hub of the conical member through the intermediary of the pedal 8 in such manner as to apply the cone 4 against the cap 3. By pushing upon this pedal with the foot, the uncoupling action is obtained by the return of the conical member in the rearward direction. The spring 6 is disposed in such manner (Fig. 9) that its effect is a maximum during the coupling action and that during the uncoupling action its bearing point 20 upon the pedal 8 is brought to the point 24, thus diminishing the lever arm of the spring and reducing the moment of rotation produced by the same upon the said pedal almost to zero, in such manner that the effort to be exerted upon the pedal will become very small and the braking action 17 upon 16 may be produced without any great effort from the foot. This disposition is essential, for the actuation by friction requires a spring of considerable strength, which could not be compressed without the use of a device of this kind.

For starting the motor or for running upon no load, it is required to render it momentarily independent of the remainder of the driving mechanism, and this result is obtained in the following manner (Figs. 9 and 10).

A hand brake lever 18, pivoted upon a shaft 19 has secured thereto a notched cam 22. The braking and clutch operating pedal 8 is provided with a pawl 23. When the brake is thrown off, the position of the cam 22 is as represented in Fig. 9. The pedal 8 is now in the coupling position. By drawing upon the lever 18, the position now assumed will be that of Fig. 10, in which the cam 22 has now raised the pawl 23 and effects the disengagement of the cone by driving back the pedal 8. The pawl 23 engages one of the notches of the cam 22 and exerts a bracing action to prevent the release of the lever 18 and the recoupling of the friction parts.

The motor is thus maintained out of engagement with the driving devices, and the starting of the motor is carried out as follows.

The arm 11 has secured thereon a toothed sector 26 whose center coincides with the axis of oscillation 2 of the motor 1. Upon the motor shaft is loosely mounted a wheel provided with coupling teeth or the like 25, which is normally held separated from a corresponding tooth disposed upon the motor shaft by means of a lever 33 pivoted upon a shaft 28; upon the said lever is caused to act an oscillating spring 29 secured at 27 to the lever 33 and at 32 to the motor casing. An elastic catch piece 30 is mounted upon the fixed sector 26. By rotating the motor 1 about 2, the wheel 25 which is in engagement with the sector 26 is brought opposite the said catch piece 30, this movement effecting the engagement of the said coupling teeth of the wheel 25 and the motor shaft. Under these conditions, if the hand lever 5 is operated to bring about a very energetic swinging movement of the motor, the wheel 25 engaging the sector 26 will carry with it the motor, and the latter will thus be started. When the motor commences to run, the coupling tooth of the motor shaft will drive back the corresponding tooth of the wheel 25, and the latter will continue to move axially as far as a previously disposed stop piece, by reason of the return action of the spring 29, oscillating on both sides of the pivoting axis of the lever 33.

Claims:

1. A power apparatus with change-speed device comprising the combination of a motor having a driving shaft and maintained in such manner as to be enabled to oscillate about an axis perpendicular to the said driving shaft, a friction member disposed upon the driving shaft, an actuated shaft, a revoluble friction member disposed on the said actuated shaft and co-operating with the first-mentioned friction member, the pivoting axis of the motor being disposed at a certain distance from the axis of the driving shaft.

2. A power apparatus with change-speed device comprising the combination of a motor having a driving shaft and maintained in such manner as to be enabled to oscillate about an axis perpendicular to the said driving shaft, a revoluble friction member disposed upon the said driving shaft, together with an actuated shaft situated in alinement with one of the positions of the driving shaft, a revoluble friction member disposed upon the said actuated shaft and co-operating with the first-mentioned friction member, the pivoting axis of the motor being disposed at a short distance from the axis of the driving shaft and therefore at a short distance from the axis of the actuated shaft.

3. A motive apparatus with change speed, comprising the combination of a motor having a driving shaft and mounted in such manner as to swing about an axis perpendicular to and at a short distance from the axis of the said driving shaft, a revoluble frictional member mounted upon the said driving shaft, an actuated shaft, a revoluble frictional member mounted upon the said actuated shaft, a swinging pedal in operative connection with the said actuated frictional member, and a spring acting upon the said pedal, the bearing point thereof upon the pedal being so disposed that during the movement of the pedal from the coupling to the uncoupling position, the moment of rotation produced by the spring upon the pedal shall decrease to an approximately zero value.

4. A motive apparatus with change speed, comprising the combination of a motor having a driving shaft and mounted in such manner as to swing about an axis perpendicular to and at a short distance from the axis of the said driving shaft, an actuated shaft, a revoluble frictional member mounted upon the said actuated shaft, a swinging pedal in operative connection with the said actuated frictional member for moving the latter towards or away from the said actuating frictional member, a spring impelling the said pedal towards the position for which the said members are in juxtaposition, a swinging notched sector, means for effecting the hand rotation of the said sector and a retaining pawl mounted upon the said pedal, the said notched sector being adapted to cooperate with the said pawl when brought into a given position and to entirely release the pawl when the said sector is brought into another position.

5. A motive apparatus with change speed, comprising the combination of a motor having a driving shaft and mounted in such manner as to swing about an axis perpendicular to and at a short distance from the axis of the said driving shaft, an actuated shaft, a revoluble frictional member mounted upon the said driving shaft, an actuated shaft, a revoluble frictional member mounted upon the said actuated shaft, means for pressing the said members against each other, a fixed toothed sector, a toothed wheel mounted loosely upon the driving shaft and rolling upon the said sector, means for placing the said wheel in or out of engagement with the said shaft, and means for effecting the swinging movement of the motor about its axis of oscillation, for the purpose hereinbefore set forth.

In testimony, that I claim the foregoing as my invention I have signed my name in presence of two subscribing witnesses.

THÉODORE LAFITTE.

Witnesses:
CLEMENT S. EDWARDS,
MAURICE ROUX.